United States Patent [19]

Babbitt et al.

[11] Patent Number: 4,466,382
[45] Date of Patent: Aug. 21, 1984

[54] PIG AND SOW FEEDER

[76] Inventors: Ora H. Babbitt; Garvin G. Babbitt, both of Rte. 1, Avoca, Iowa 51521

[21] Appl. No.: 508,842

[22] Filed: Jun. 29, 1983

[51] Int. Cl.³ ............................................. A01K 5/00
[52] U.S. Cl. .................................. 119/52 R; 119/53; 119/59
[58] Field of Search ................... 119/52 R, 53, 59, 20, 119/53.5

[56] References Cited

U.S. PATENT DOCUMENTS

| | | | |
|---|---|---|---|
| 402,145 | 4/1889 | Critchfield | 119/59 |
| 1,120,178 | 12/1914 | Berghofer | 119/52 R |
| 1,587,548 | 6/1926 | Olson | 119/53 |
| 3,196,835 | 7/1965 | Bergevin | 119/51 |
| 3,237,600 | 3/1966 | Behrens | 119/20 |
| 3,269,357 | 8/1966 | Rezabek | 119/16 |
| 3,307,519 | 3/1967 | Rink | 119/20 |
| 3,318,286 | 5/1967 | Hargett | 119/20 |
| 3,405,684 | 10/1968 | Ott | 119/59 |
| 3,782,332 | 1/1974 | Depenthal | 119/51.5 |
| 3,985,104 | 10/1976 | Klemer | 119/51.5 |
| 4,006,715 | 2/1977 | Redmon | 119/20 |
| 4,121,538 | 10/1978 | Van Gilst | 119/20 |

Primary Examiner—J. N. Eskovitz
Attorney, Agent, or Firm—Zarley, McKee, Thomte, Voorhees & Sease

[57] ABSTRACT

A pig and sow feeder comprising a pig feeder unit having a trough portion at the lower end thereof and a hopper positioned thereabove adapted to supply feed to the trough portion. The sow feeder unit includes a trough portion at the lower end thereof and a hopper positioned thereabove adapted to supply feed thereto. The trough portions of the sow and pig feeder units are disposed relative to each other so that the trough of the pig feeder may be positioned in the creep area of a farrowing pen and so that the trough of the sow feeder unit may be positioned in the farrowing crate portion of a farrowing pen. The troughs of the feeder units are in communication with each other so that feed in the trough of the pig feeder may be swept into the trough of the sow feeder. A slide gate normally prevents communication between the troughs of the feeder units.

6 Claims, 6 Drawing Figures

PIG AND SOW FEEDER

BACKGROUND OF THE INVENTION

This invention relates to a feeder and more particularly to a pig and sow feeder.

Conventional farrowing crates normally include a centrally disposed farrowing crate portion for the sow and creep areas or portions disposed laterally of the farrowing crate portion to enable the pigs to move away from the sow but yet gain access to the sow for nursing purposes. The sow is normally fed by means of some sort of feeder mechanism positioned at one end of the farrowing crate portion. After the pigs have reached a certain age, the pigs are also fed through some sort of feeder arrangement. It is very difficult to teach the small pigs to eat feed. This problem is complicated by the fact that the pigs do contaminate or soil the feed in their trough and the soiled feed presents a further deterrent to the pigs consuming the feed. In presently available pig feeders, the soiled feed must be scraped out of the trough and either thrown away or fed to the sow. This is a time-consuming task and does result in the waste of feed.

Therefore, it is a principal object of the invention to provide a combination pig and sow feeder.

A further object of the invention is to provide a pig and sow feeder including trough portions for the pigs and sow which are disposed at right angles to one another so that the trough portions may be positioned in the farrowing crate portion and the creep area.

A further object of the invention is to provide a pig and sow feeder including means for conveniently transferring soiled feed from the pig trough to the sow trough.

Yet another object of the invention is to provide a pig and sow feeder which is economical of manufacture and durable in use.

These and other objects will be apparent to those skilled in the art.

SUMMARY OF THE INVENTION

Figure 1:
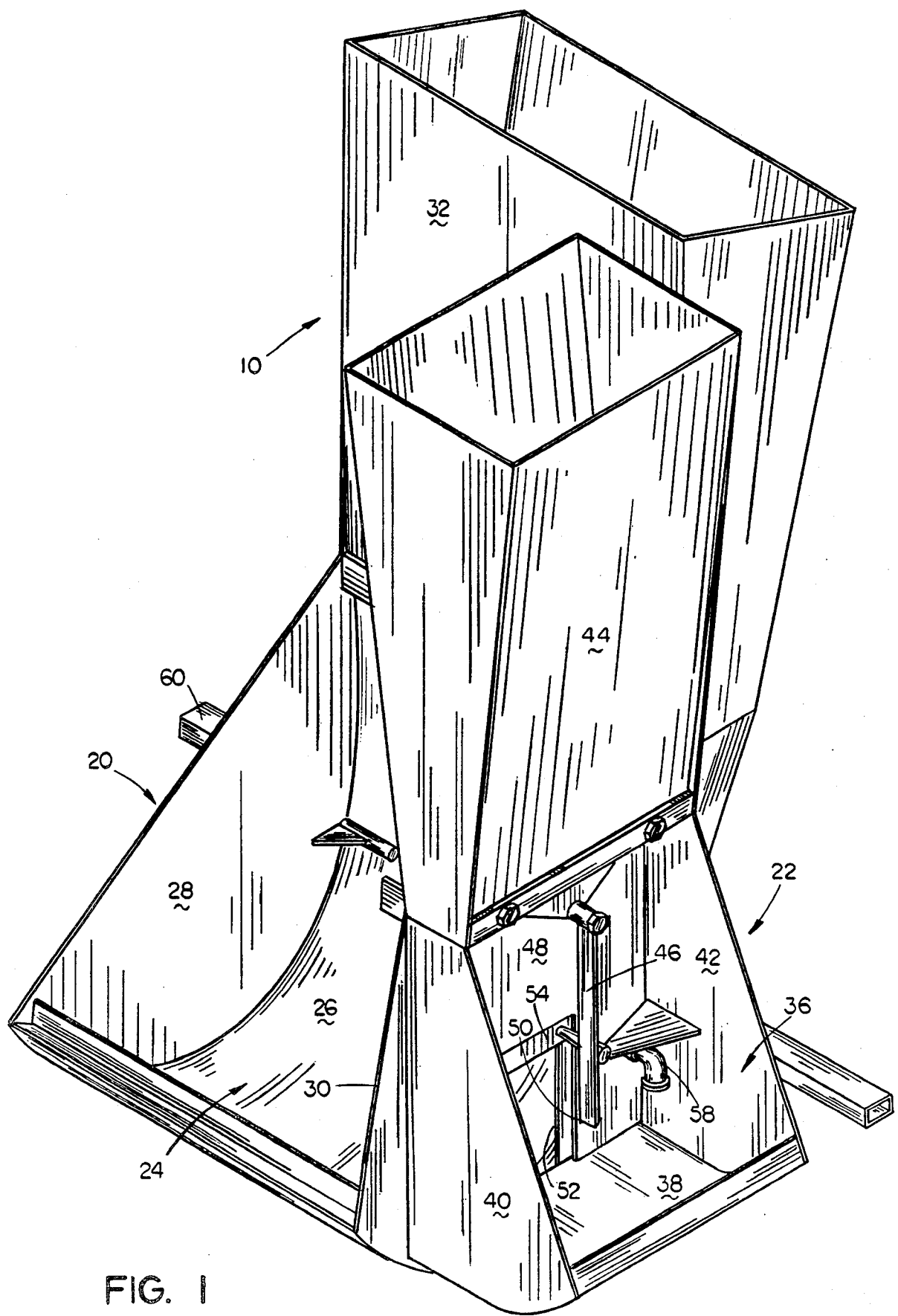
FIG. 1 is a perspective view of the pig and sow feeder of this invention.
Figure 2:
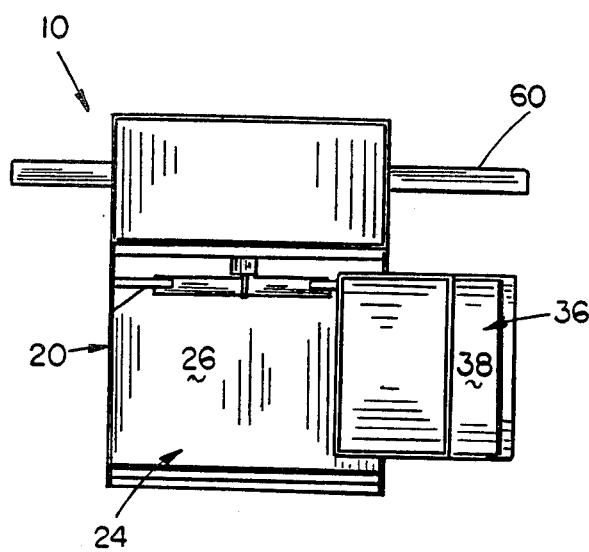
FIG. 2 is a top view of the pig and sow feeder.
Figure 5:
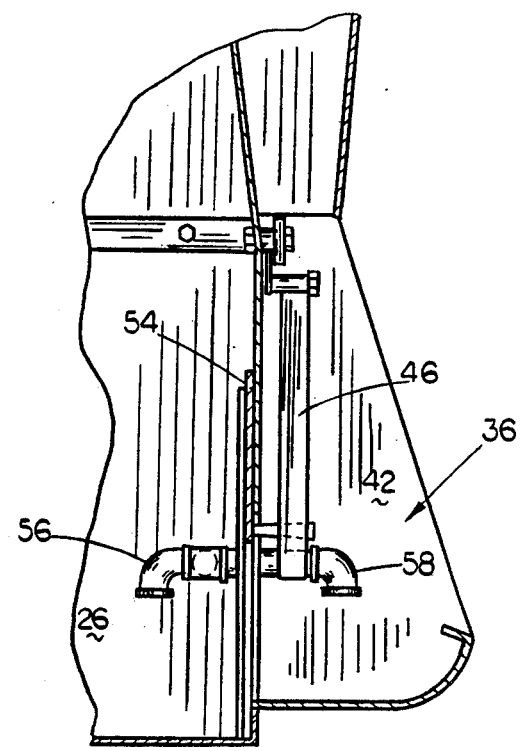
FIG. 5 is an enlarged sectional view seen on lines 5—5 of FIG. 4.
Figure 3:
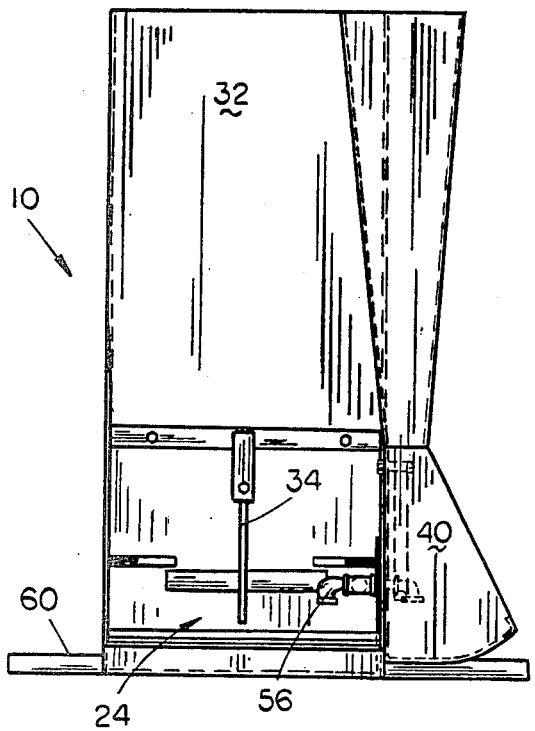
FIG. 3 is a side elevational view of the feeder.
Figure 4:
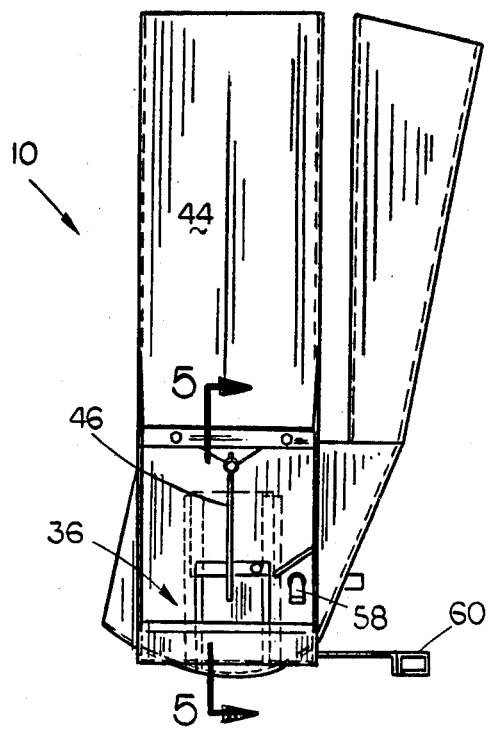
FIG. 4 is a side elevational view of the feeder taken at right angles to FIG. 3.
Figure 6:
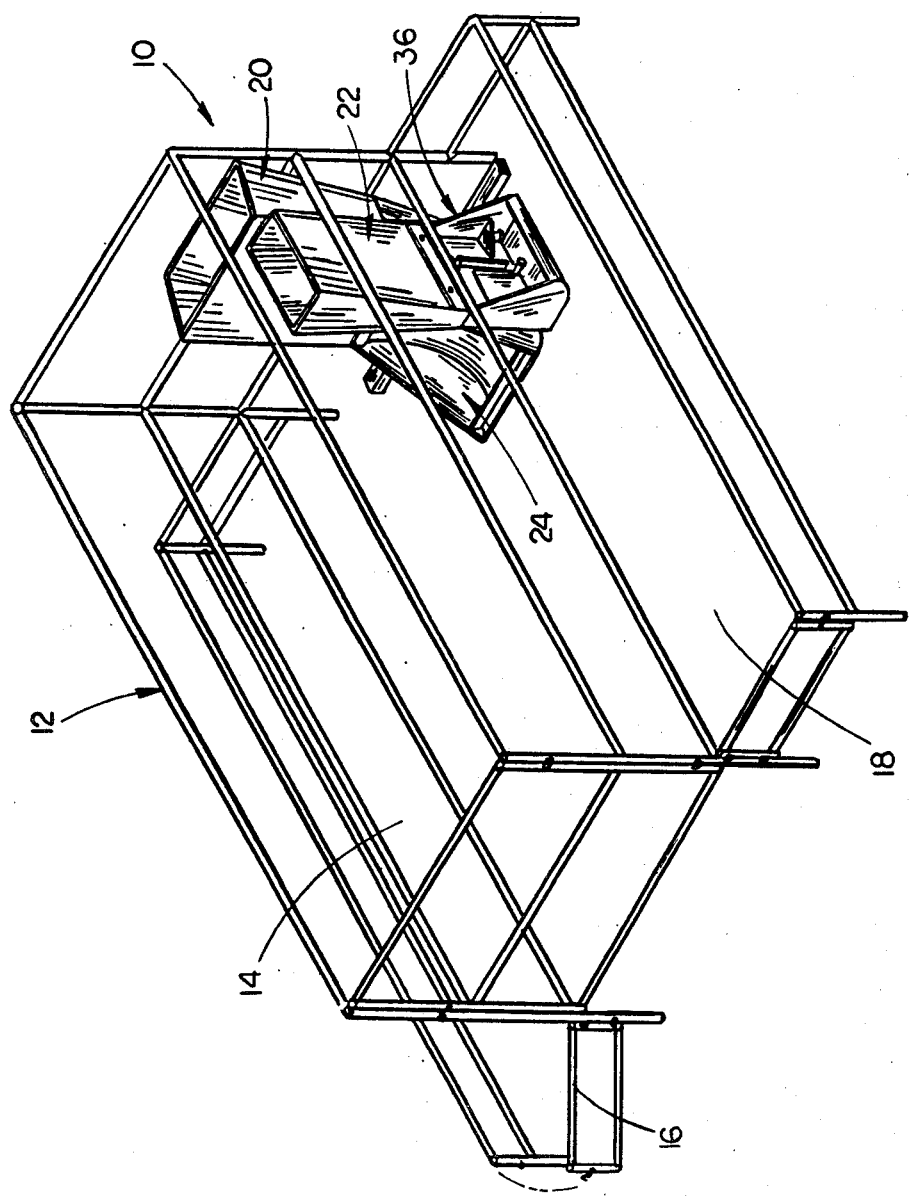
FIG. 6 is a perspective view illustrating the feeder of this invention positioned in a farrowing crate.

A pig and sow feeder is described which is ideally suited for use in a farrowing crate assembly including a farrowing crate portion and a creep area disposed at one side thereof. The feeder of this invention comprises pig and sow feeder units which are disposed transversely with respect to each other so that the trough portion of the pig feeder will be positioned in the creep area and so that the trough of the sow feeder will be positioned in the farrowing crate portion of the assembly. The troughs of the sow and pig feeder units are in communication with each other so that soiled feed in the pig trough may be swept into the trough of the sow trough. A slide gate normally prevents communication between the troughs of the feeder units.

DESCRIPTION OF THE PREFERRED EMBODIMENT

The pig and sow feeder of this invention is referred to generally by the reference numeral 10 and is ideally suited for use in a farrowing crate assembly 12 which includes a farrowing crate portion 14 and creep areas 16 and 18 on opposite sides thereof. The farrowing crate assembly is of conventional construction and does not form a part of this invention. The crate portion 14 is designed to contain the sow while the creep areas 16 and 18 are designed to provide areas for the pigs into which the sow cannot intrude.

Feeder 10 includes a sow feeder unit 20 and a pig feeder unit 22 which is disposed transversely to a sow feeder unit 20. Unit 20 is provided with a trough portion 24 having an arcuate bottom 26 and side walls 28 and 30. Trough portion 24 is in communication with a feed hopper 32 positioned thereabove adapted to supply feed to the trough portion 24. A conventional sow operated valve assembly 34 is also provided to enable the sow to cause feed to drop from hopper 32 into trough portion 24.

Pig feeder unit 22 is provided with a trough portion 36 including an arcuate bottom 38 and side walls 40 and 42. Trough portion 36 is in communication with a feed hopper 44 positioned thereabove adapted to supply feed to the trough portion 36. A conventional pig operated valve assembly 46 is also provided to enable the pigs to cause feed to drop from hopper 44 into trough portion 36. Trough portion 36 also includes a back wall 48 which has an opening 50 formed therein which is in communication with opening 52 formed in side wall 30 of trough portion 24.

A manually operated and normally closed slide gate 54 is vertically slidably mounted between the openings 50 and 52 as seen in FIG. 1. It should be noted that the bottom of trough portion 36 is positioned slightly above the bottom of trough portion 24 to permit feed in trough portion 36 to be swept or otherwise passed into trough portion 24. The numerals 56 and 58 refer to conventional water nipple fittings for the sow and pigs respectively. As seen in the drawings, frame member 60 is secured to the unit for stability purposes.

In operation, the feeder 10 is installed in the farrowing crate assembly 12 in one corner thereof so that trough portion 36 is accessible to creep area 18 and so that trough portion 24 is accessible to the farrowing crate portion 14. The hoppers 32 and 44 would then be filled with the feed to be fed to the sow and pigs respectively. The water fittings 56 and 58 would also be connected to a source of water in conventional fashion. It can be seen that the sow may water and feed from trough portion 34 and that the pigs may water and feed from trough portion 36. The pigs may utilize trough portion 36 without interference from the sow since the sow cannot enter the creep area 18. When the pig feed and trough portion 36 becomes contaminated or soiled, the pigs would normally refuse to eat. However, the contaminated or soiled feed in trough portion 36 is easily removed therefrom by raising the slide gate 54 and sweeping the contaminated feed into trough portion 24 through the openings 50 and 52. The slide gate 54 is then closed. The sow will eat the soiled feed which was swept into trough portion 24 and the consumption of the feed by the sow eliminates feed waste.

Thus it can be seen that a novel combination sow and pig feeder has been provided which is not only convenient to use but which substantially reduces feed waste. Therefore it can be seen that the invention accomplishes at least all of its stated objectives.

I claim:

1. A pig and sow feeder comprising, a pig feeder unit including a lower trough portion and a
hopper means positioned thereabove adapted to supply feed thereto, and a sow feeder unit including a lower trough portion and a
hopper means positioned thereabove adapted to supply feed thereto, said trough portions of said sow and pig feeder units being
disposed relative to each other so that the trough portion of said pig feeder unit is directed toward the creep area of a farrowing pen and so that said trough portion of said sow feeder unit may be positioned in the farrowing crate portion of a farrowing pen,
said trough portion of said pig feeder unit having a selectively closable opening formed therein which communicates with said trough portion of said sow feeder unit so that unused feed in said trough portion of said pig feeder unit may be selectively passed into said trough portion of said sow feeder unit through said opening.

2. The feeder of claim 1 wherein said trough portions are disposed transversely with respect to each other.

3. The feeder of claim 1 wherein said trough portion of said sow feeder unit is substantially larger than said trough portion of said pig feeder unit.

4. The feeder of claim 1 wherein said trough portion of said sow feeder unit is disposed below the trough portion of said pig feeder unit so that said unused feed will drop downwardly into the trough portion of said sow feeder unit.

5. A pig and sow feeder comprising,
a pig feeder unit including a trough portion,
a sow feeder unit including a trough portion,
a feed hopper means above said trough portions for supplying feed thereto,
said trough portions being in selective communication with each other so that unused feed in said pig feeder trough portion may be passed into said trough portion of said sow feeder unit,
a selectively closable opening between said trough portions for passing said unused feed from said pig feeder trough portion to said sow feeder trough portion.

6. The feeder of claim 5 wherein said trough portions are positioned relative to each other to permit the pigs to gain access to the pig feeder trough portion while preventing access thereto to a sow.

* * * * *